H. G. VANCE.
LUBRICATING PULLEY.
APPLICATION FILED FEB. 27, 1911.
1,012,482.
Patented Dec. 19, 1911.
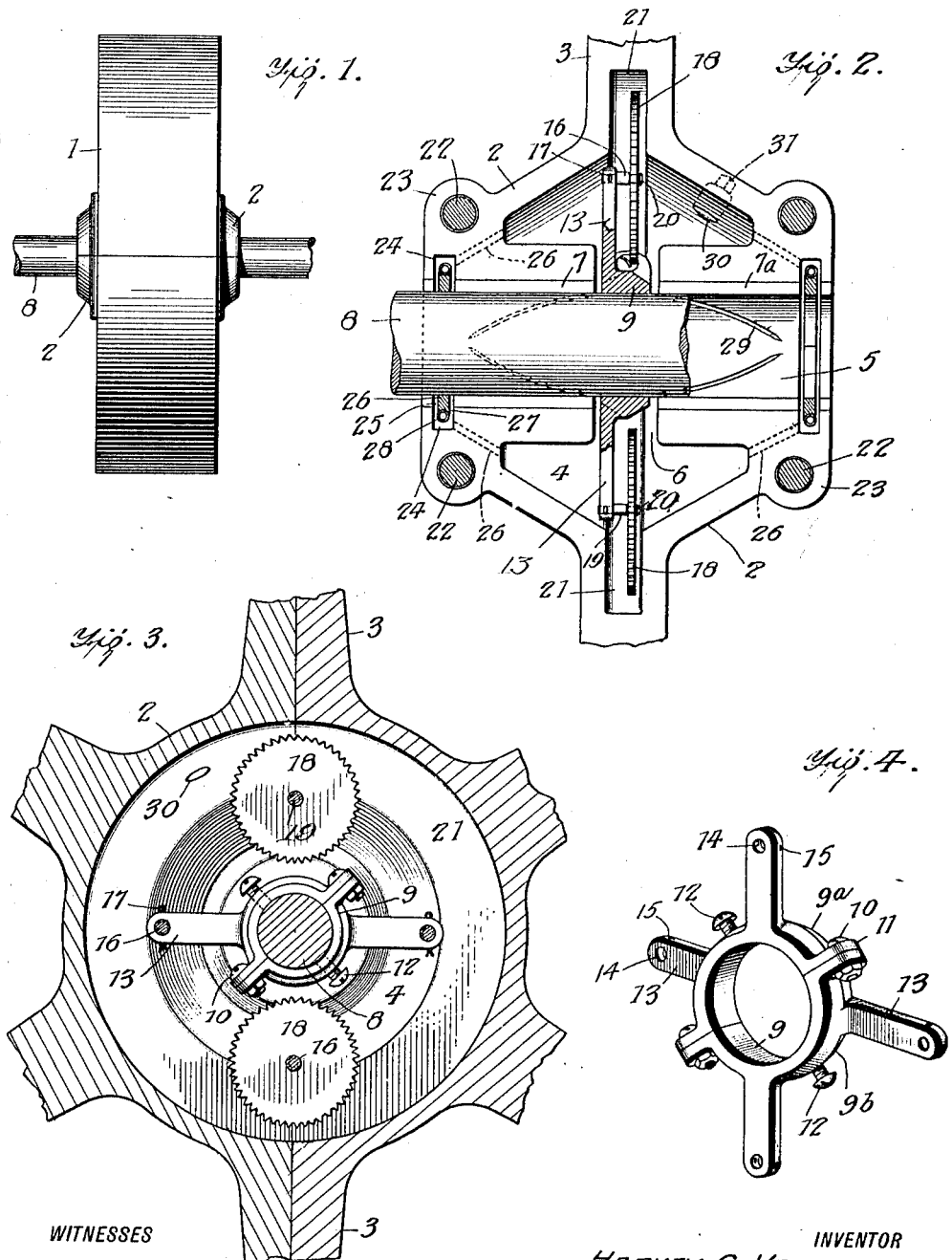
WITNESSES
INVENTOR
HARVEY G. VANCE,
BY
ATTORNEYS

UNITED STATES PATENT OFFICE.

HARVEY GEORGE VANCE, OF ST. LOUIS, MISSOURI.

LUBRICATING-PULLEY.

1,012,482. Specification of Letters Patent. Patented Dec. 19, 1911.

Application filed February 27, 1911. Serial No. 610,989.

*To all whom it may concern:*

Be it known that I, HARVEY GEORGE VANCE, a citizen of the United States, and a resident of St. Louis, State of Missouri, have invented a new and useful Improvement in Lubricating-Pulleys, of which the following is a specification.

My invention is an improvement in lubricating pulleys, and consists in certain novel constructions and combinations of parts hereinafter described and claimed.

Referring to the drawings forming a part hereof: Figure 1 is an edge view of the pulley, Fig. 2 is an enlarged face view of a portion of one section of the hub; Fig. 3 is a transverse vertical section of the same; and Fig. 4 is a detail perspective view of the supporting frame.

In the present embodiment of the invention the pulley consists of a rim 1, a hub 2, and spokes 3 connecting the hub and rim, and the hub 2 is provided with an annular chamber 4 which communicates with the bore 5 of the chamber by means of an annular passage 6.

A bushing is arranged between the hub and the shaft 8, and the said bushing is made in two sections, 7 and 7ª, and each section consists of four portions. The innermost portions of each section are spaced apart at their inner ends so that the passage 6 extends to the outer surface of the shaft. The inner ends of the said innermost portions are flush with the wall of the passage. A sectional ring 9 is secured on the shaft in the passage 6 by means of bolts 10 passing through radial lugs 11 on the ends of the sections 9ª and 9ᵇ of the ring. The ring is held from rotation by means of set-screws 12 which pass through the ring and engage the shaft. The ring is provided with a plurality of radial arms 13, four in the present instance, and the arms extend alternately from the opposite side of the ring. Each arm is provided with a transverse perforation 14 at its outer end and with an opening 15 at right angles to the perforation and intersecting the same. A stub shaft 16 is received in each perforation 14, and each shaft is held in place by a cotter pin 17 which passes through the opening 15. A toothed wheel 18 is journaled on a reduced portion 19 on each shaft and is held from movement longitudinally of the shaft by a head 20 connected with the end of the shaft in any suitable manner.

It will be noticed that the chamber 4 of the hub is annular in form, and at its longitudinal center the chamber is enlarged radially, as at 21, to receive the wheels 18. The hub is, as before stated, sectional, being composed of two similar sections held together by bolts 22 which pass through registering perforated ears 23 on the sections. At each end the hub is annularly recessed or grooved, as shown at 24, and the bushing 7 is also provided with an annular channel 25 registering with the groove 24. A plurality of passages 26 lead from the bottom of the groove 25 and open into the chamber 4, and the said passages incline outwardly toward the center of the pulley. A collecting ring 27 is secured to the shaft 8 in each of the annular chambers formed by the grooves 24—25. Each ring is sectional and the periphery of the ring is grooved, as shown at 27. A ring 28 of resilient material is sprung into the groove to clamp the sections to the shaft. Spiral passages 29 lead from the space between the adjacent ends of the flanges 6 and the said passages end near the collecting rings 26. The said passages conduct the lubricant toward the ends of the hub.

In operation, the chamber 4 is partially filled with a suitable lubricant through an oil hole 30 in the hub, the said hole being closed by a screw plug 31 when not in use. The plug is removed to permit the chamber to be filled and is then re-inserted. As the pulley rotates the oil is carried therewith. The toothed wheel retards the lubricant and causes it to stand at an approximately equal depth in the chamber 21. The inner face or surface of the said chamber is coaxial with the shaft. A certain amount of drag is exerted by the oil on the wheels. The drag is greatest at their outer edges, and the wheels are consequently rotated and throw the oil onto the shaft. The oil strikes the shaft and passes through the passages 29 to the ends of the hub. The collecting rings, however, deflect the oil into the chambers formed by the grooves 24—25 and it is returned to the chamber 4 by the passages 26. In case the shaft rotates the ring 9 and wheels 18 are carried therewith, the wheels 18 passing through the oil throw it on the shaft 8 in practically the same manner. It will be evident that a greater or a lesser number of wheels 18 might be made use of. However, whether one wheel or more is used, the principle is the same.

I claim:

1. In combination with the shaft and the pulley journaled thereon, said pulley having an annular chamber encircling the bore for containing lubricant, and having an annular passage at approximately its center leading from the bore of the pulley to the chamber, a sectional ring held detachably on the shaft in the passage, said ring having spaced radial arms, set-screws passing through the ring and engaging the shaft for constraining the ring to rotate therewith, a stub shaft at the end of each arm, a toothed wheel journaled on each shaft, the hub having an internal annular groove near each end and having passages leading from each groove to the chamber, a collecting ring in each groove, each ring comprising similar sections, the ring having a peripheral groove, and a resilient ring in the groove for holding the sections of the ring on the shaft, the shaft having passages leading from the annular passage toward the collecting rings.

2. In combination with the shaft and the pulley journaled thereon, said pulley having an annular chamber encircling the bore for containing lubricant, and having an annular passage at approximately its center leading from the bore of the pulley to the chamber, a sectional ring held detachably on the shaft in the passage, said ring having spaced radial arms, set-screws passing through the ring and engaging the shaft for constraining the ring to rotate therewith, a stub shaft at the end of each arm, a toothed wheel journaled on each shaft, the hub having an internal annular groove near each end and having passages leading from each groove to the chamber, and a collecting ring in each groove, said shaft having passages leading from the annular passage toward the rings.

3. In combination with the shaft and the pulley journaled thereon, said pulley having an annular chamber encircling the bore for containing lubricant, and having an annular passage at approximately its center leading from the bore of the pulley to the chamber, a sectional ring held detachably on the shaft in the passage, said ring having spaced radial arms, set-screws passing through the ring and engaging the shaft for constraining the ring to rotate therewith, a stub shaft at the end of each arm, a toothed wheel journaled on each shaft, the hub having an internal annular groove near each end and having passages leading from each groove to the chamber, a collecting ring in each groove, each ring comprising similar sections, the ring having a peripheral groove, and a resilient ring in the groove for holding the sections of the ring on the shaft.

4. In combination with the shaft and the pulley journaled thereon, said pulley having an annular chamber encircling the bore for containing lubricant, and having an annular passage at approximately its center leading from the bore of the pulley to the chamber, a sectional ring held detachably on the shaft in the passage, said rings having spaced radial arms, set-screws passing through the ring and engaging the shaft for constraining the ring to rotate therewith, a stub shaft at the end of each arm, a toothed wheel journaled on each shaft, the hub having an internal annular groove near each end and having passages leading from each groove to the chamber, and a collecting ring in each groove.

5. In combination with the shaft and the pulley journaled thereon, said pulley having an annular chamber encircling the bore for containing lubricant, and having an annular passage at approximately its center leading from the bore of the pulley to the chamber, a sectional ring held detachably on the shaft in the passage, said ring having spaced radial arms, set-screws passing through the ring and engaging the shaft for constraining the ring to rotate therewith, a stub shaft at the end of each arm, a toothed wheel journaled on each shaft, the hub having an internal annular groove near each end and having passages leading from the groove to the chamber, said passages inclining outwardly toward their inner ends, a collecting ring in each groove, and means for clamping the ring on the shaft, said hub having passages leading from the annular passage toward the collecting rings.

6. In combination with the shaft and the pulley journaled thereon, said pulley having an annular chamber encircling the bore for containing lubricant, and having an annular passage at approximately its center leading from the bore of the pulley to the chamber, a sectional ring held detachably on the shaft in the passage, said ring having spaced radial arms, set-screws passing through the ring and engaging the shaft for constraining the ring to rotate therewith, a stub shaft at the end of each arm, a toothed wheel journaled on each shaft, the hub having an internal annular groove near each end and having passages leading from the groove to the chamber, said passages inclining outwardly toward their inner ends, a collecting ring in each groove, and means for clamping the ring on the shaft.

7. In combination with the shaft and the pulley journaled thereon, said pulley having an annular chamber encircling the bore for containing lubricant, and having an annular passage at approximately its center leading from the bore of the pulley to the chamber, a sectional ring held detachably on the shaft in the passage, said ring having spaced radial arms, set-screws passing through the ring and engaging the shaft for constraining the ring to rotate therewith, a stub shaft at the end of each arm, a toothed wheel journaled on each stub shaft, the shaft having passages leading from the annular passage toward the ends of the hub, and means at the said ends for collecting and returning the oil.

8. In combination with the shaft and the pulley journaled thereon, said pulley having an annular chamber encircling the bore for containing lubricant, and having an annular passage at approximately its center leading from the bore of the pulley to the chamber, a sectional ring held detachably on the shaft in the passage, said ring having spaced radial arms, set-screws passing through the ring and engaging the shaft for constraining the ring to rotate therewith, a stub shaft at the end of each arm, and a toothed wheel journaled on each shaft.

9. In combination with the shaft and the pulley thereon, said pulley having an annular chamber for holding a lubricant and having an annular passage in its bore at approximately the center thereof communicating with the chamber, of a ring secured to the shaft in the passage and having radial arms, a wheel journaled on each arm on an axis parallel to the shaft, the hub having an annular groove in its bore near each end communicating with the chamber, and a collecting ring secured to the shaft in each groove, the hub having passages leading from the annular passage toward the rings.

10. In combination with the shaft and the pulley thereon, said pulley having an annular chamber for holding a lubricant and having an annular passage in its bore at approximately the center thereof communicating with the chamber, of a ring secured to the shaft in the passage and having radial arms, a wheel journaled on each arm on an axis parallel to the shaft, the hub having an annular groove in its bore near each end communicating with the chamber, and a collecting ring secured to the shaft in each groove.

11. In combination with the shaft and the pulley thereon, said pulley having an annular chamber for holding a lubricant and having an annular passage in its bore at approximately the center thereof communicating with the chamber, of a ring secured to the shaft in the passage and having radial arms, and a wheel journaled on each arm on an axis parallel to the shaft, the hub having passages leading from the annular passage toward the ends of the hub.

12. In combination with the shaft and the pulley thereon, said pulley having an annular chamber for holding a lubricant and having an annular passage in its bore at approximately the center thereof communicating with the chamber, of a ring secured to the shaft in the passage and having radial arms, and a wheel journaled on each arm on an axis parallel to the shaft.

13. In combination with the shaft and the pulley thereon, said pulley having an annular chamber for holding a lubricant and having an annular passage in its bore at approximately the center thereof communicating with the chamber, of a ring secured to the shaft in the passage and having radial arms, a wheel journaled on each arm on an axis parallel to the shaft, the hub having an annular groove in its bore near each end, and a collecting ring in each groove, the hub having passages leading from each groove to the chamber and inclining outwardly toward the chamber.

14. In combination with the shaft and the pulley thereon, said pulley having an annular chamber for holding a lubricant and having an annular passage in its bore at approximately the center thereof communicating with the chamber, a plurality of arms extending radially from the shaft in the passage, a wheel journaled on each arm on an axis parallel to the shaft, the hub having an annular groove in its bore near each end communicating with the chamber, and a ring secured to the shaft in each groove.

15. In combination with the shaft and the pulley thereon, said pulley having an annular chamber for holding a lubricant and having an annular passage in its bore at approximately the center thereof communicating with the chamber, a plurality of arms extending radially from the shaft in the passage, and a wheel journaled on each arm on an axis parallel to the shaft.

16. In combination with the shaft and the pulley thereon, said pulley having an annular chamber for holding a lubricant and having an annular passage in its bore at approximately the center thereof communicating with the chamber, a plurality of arms extending radially from the shaft in the passage, and a wheel on each arm.

HARVEY GEORGE VANCE.

Witnesses:
MAYMIE T. VANCE,
NORMAN STEWART.